(12) United States Patent
    Wilcher

(10) Patent No.: US 8,999,174 B1
(45) Date of Patent: Apr. 7, 2015

(54) CHLORINE TABLET CHAMBER VACUUM SYSTEMS

(71) Applicant: Gayle Arden Wilcher, Shingle Springs, CA (US)

(72) Inventor: Gayle Arden Wilcher, Shingle Springs, CA (US)

( * ) Notice: Subject to any disclaimer, the term of this patent is extended or adjusted under 35 U.S.C. 154(b) by 0 days.

(21) Appl. No.: 13/863,104

(22) Filed: Apr. 15, 2013

Related U.S. Application Data

(60) Provisional application No. 61/625,016, filed on Apr. 16, 2012.

(51) Int. Cl.
| | |
|---|---|
| *C02F 1/76* | (2006.01) |
| *C02F 1/68* | (2006.01) |
| *B01F 1/00* | (2006.01) |
| *C02F 103/42* | (2006.01) |

(52) U.S. Cl.
CPC . *C02F 1/76* (2013.01); *C02F 1/688* (2013.01); *C02F 2103/42* (2013.01); *B01F 2001/0061* (2013.01); *B01F 1/0027* (2013.01)

(58) Field of Classification Search
CPC ........ C02F 1/688; C02F 1/76; C02F 2103/42; B01F 1/0027; B01F 1/0033; B01F 2001/0061
See application file for complete search history.

(56) References Cited

U.S. PATENT DOCUMENTS

| | | | |
|---|---|---|---|
| 4,260,587 A | 4/1981 | Braden | |
| 4,780,197 A | 10/1988 | Schuman | |
| 5,810,043 A | 9/1998 | Grenier | |
| 5,810,999 A * | 9/1998 | Bachand et al. | 210/206 |
| 6,544,414 B2 | 4/2003 | Hammonds | |

* cited by examiner

*Primary Examiner* — Lucas Stelling
(74) *Attorney, Agent, or Firm* — RG Patent Consulting, LLC; Rachel Gilboy

(57) ABSTRACT

A chlorine tablet chlorinator vacuum evacuation system for attaching to a chlorine tablet chlorinator used in a potable water system. The chlorine tablet chlorinator vacuum evacuation system is continuously running to remove chlorine gas as it is liberated from calcium hypochlorite, sodium dichloroisocyanurate, or trichloroisocyanuric acid tablets so that a back pressure event does not expel chlorine gas to the inside of a human occupyable space. The chlorine tablet chlorinator vacuum evacuation system is reliable in that all of the components are resistant to the oxidizing effects of chlorine gas. The apparatus comprises an upper body joined to a lower body secured by a plate fastened to both flanges of the upper and lower body. The upper body has a vacuum port and a discharge port. The lower body has a nozzle and a centrally located cone assembly creating a venturi effect with air movement.

19 Claims, 6 Drawing Sheets ic chlorination systems. Chlorine tablets are a combination of
CHLORINE TABLET CHAMBER VACUUM SYSTEMS

CROSS-REFERENCE TO RELATED APPLICATION

The present application is related to and claims priority from prior provisional application Ser. No. 61/625,016, filed Apr. 16, 2012 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

The following includes information that may be useful in understanding the present invention(s). It is not an admission that any of the information provided herein is prior art, or material, to the presently described or claimed inventions, or that any publication or document that is specifically or implicitly referenced is prior art.

BACKGROUND OF THE INVENTION

1. Field of the Invention

The present invention relates generally to the field of water treatment using chlorination means, and more specifically relates to a chlorine tablet chlorinator vacuum evacuation system.

2. Description of the Related Art

The most utilized and cost effective method of treating drinking water in modern water systems is with chlorine. Chlorine gas is a strong oxidizer and effectively kills microscopic pathogens rendering the water safe to drink from organic constituents such as viruses, bacteria, and other microbial organisms. Other methods of water disinfection may be utilized as well, such as ozone, ultraviolet light, hydrogen peroxide, filtration, chloramines, chlorine dioxide, and combinations or variations of these as well as other methods. Whichever method of disinfection is used, it must be reliable in view of public health concerns.

In 1974, congress passed the Safe Drinking Water Act in response to a lack of uniform standards between federal, state, and local agencies which varied the safety of the drinking water from locale to locale. The act established a cooperative program between all agencies setting maximum acceptable levels for certain contaminants commonly found in drinking water, and set requirements for treatment methods, system testing, and water system record keeping.

Due to its reliability and cost effectiveness, chlorine gas has been the most widely used method for water treatment. Chlorine oxidizes organic substances on contact and provides a reasonable assurance that the water is safe to drink when a free chlorine residual is detected. A free chlorine residual of at least 0.2 parts per million is required by all agencies. Chlorine gas is also the most dangerous element to use in the water treatment process. Operators that work with gas chlorination systems must be highly trained and certified due to its lethal nature. Many states require that any type of chlorine treatment system that has a potential to discharge dangerous gases into space designed for human occupation to install air scrubbers. Air scrubbing equipment is typically costly to install.

Accidents and fatalities in water systems using chlorine gas prompted the EPA and state agencies to tighten regulations on its methods of use. Many water systems turned to tablet chlorination systems. Chlorine tablets are a combination of inert ingredients and chlorine gas. The chlorine gas is bound with the inert ingredients, but the gas continuously liberates from the inert ingredients at various rates depending on the specific composition of a tablet and/or manufacturer.

Chlorine gas leaks in water systems pose a serious threat to health and life for an exposed operator. The level considered to be Immediately Dangerous to Life and Health (IDLH) is the low level of 25 parts per million. The occurrences of exposures have been reduced greatly by the increase in usage of tablet chlorinators but because of the off-gassing of chlorine tablets, a danger still exists, although reduced. A building housing any chlorinator must meet certain design requirements in regards to ventilation and rates of air change, however, ventilation usually will only begin to occur with the opening of a man door. Rarely does an operator wait for ventilation to occur before entering a room that houses a chlorinator. Additionally, tablet chlorinators tend to burp a considerable amount of liberated chlorine gas past the lid seal of a tablet chamber during a back pressure event. Back pressure most commonly occurs when water flow reverses direction momentarily as a water-well shuts down, forcing chlorine gas contained within the sealed tablet chamber past the lid into the room with anyone present. Depending on the proximity to a tablet chlorinator during this event, an operator can easily be exposed to toxic levels of dangerous gas. An effective and cost-effective solution to this safety issue is needed.

Various attempts have been made to solve the above-mentioned problems such as those found in U.S. Pat. Nos. 5,810,043; 6,544,414; 4,260,587; and 4,780,197. This prior art is representative of tablet chlorinators. None of the above inventions and patents, taken either singly or in combination, is seen to describe the invention as claimed.

Ideally, a chlorine tablet chlorinator vacuum evacuation system should provide continuous and complete chlorine gas removal and longevity in-use, and yet, would operate reliably and be manufactured at a modest expense. Thus, a need exists for a reliable chlorine tablet chlorinator vacuum evacuation system to safely remove liberated chlorine gas from the tablet chlorinator, and to avoid the above-mentioned problems.

BRIEF SUMMARY OF THE INVENTION

In view of the foregoing disadvantages inherent in the known tablet chlorinator art, the present invention provides a novel chlorine tablet chamber vacuum device. The general purpose of the present invention, which will be described subsequently in greater detail, is to prevent chlorine gas from entering the breathing air of a building, thereby promoting worker safety.

Generally speaking, the chlorine tablet chlorinator vacuum evacuation system is attachable to a chlorine tablet chamber via a suction tube penetrating the upper sidewall of the chamber. Some tablet chlorinator units may have a vent system connecting a solution tank to the tablet chamber, in which case, the gases from both enclosures will be evacuated by the reliable chlorine tablet chlorinator vacuum evacuation system. The system is designed to continuously run on a minimum of power to remove chlorine gas (and odors) as it is liberated from Calcium Hypochlorite Tablets, Sodium Dichloroisocyanurate Tablets, and trichloroisocyanuric acid tablets so that during a back pressure event (such as is common when water wells with head pressure and using manual check valves are shut down), the chlorine gas and air mixture is safely vented to the outside of the human-occupied space. When a back pressure event typically takes place, reverse flow occurs momentarily forcing air and chlorine gas past the lid seal of a tablet chlorinator, into the building air space where it is not readily dissipated and as such, poses extreme danger to a water system operator entering the room, an undesirable condition which the present invention serves to eliminate. In addition, these fumes are extremely corrosive and damaging to all electrical/electronic parts and most equipment in the chlorine room. The chlorine tablet chlorinator vacuum evacuation system is reliable in that all of the components are resistant to the oxidizing effects of chlorine gas, promoting longevity and reliability in such a system.

Described in further detail, a chlorine tablet chlorinator vacuum evacuation system as disclosed herein in a preferred embodiment comprises a tablet chamber vacuum assembly having an upper body with a cylinder having a vacuum port, an intake opening, a discharge opening, an upper flange, and an elbow. The elbow is not always necessary. A lower body comprises a column having an inlet aperture, a discharge aperture, a stepped venturi nozzle, and a cone assembly having a conical tip integral with a tubular body having spacer fins. The tubular body is preferably slotted to receive the spacer fins, and includes a lower flange. A fan housing is also included for mounting an electric fan, a junction box with an electrical connection, and a mounting plate.

The vacuum port and the cylinder are preferably integral and the vacuum port is positioned perpendicularly to the discharge opening and to the intake opening of the cylinder. The tablet chamber vacuum assembly is able to be mounted to the tablet chamber by the vacuum port at any angle throughout a 360 degree rotation (as per application and spacing parameters.) The tablet chamber vacuum assembly is also able to be attached to more than one chlorine containing tank that is connected in series if desired. The vacuum port is preferably removably attached to a down tube extending through a sidewall of the tablet chamber.

The intake opening of the upper body is mounted circumferentially over and about the discharge aperture of the lower body, the lower body mounted to the fan housing, the upper body and the lower body positioned in a static coupled relationship via the mounting plate with the upper flange and the lower flange secured to the mounting plate. The column of the lower body is about 3 inches in diameter, the cylinder of the upper body is about 3 inches in diameter, the vacuum port of the cylinder is about 1½ inches in diameter, and the cylinder having the vacuum port may comprise a pipe Tee. It should be appreciated that other sizes and configurations are available in alternate embodiments of the present invention; however this dimensioning is preferred to achieve proper flow. The upper flange is mounted to the discharge opening of the cylinder. The elbow is also mounted to the discharge opening of the cylinder, whereby the elbow is able to be connected to exhaust piping enabling off-gassed chlorine to be remotely exhausted.

The tablet chamber vacuum assembly is comprised of chlorine resistant material incorporating preferably acrylonitrile butadiene styrene plastic. The cone assembly is received interiorly within an inner volume of the lower body and the spacer fins provide that the cone assembly is mounted (and held) concentrically within the inlet aperture of the lower body, with the conical tip facing towards the discharge aperture of the lower body. The conical tip of the cone assembly extends into the tapered interior volume of the stepped venturi nozzle; the tubular body and the spacer fins contained within the inner volume of the lower body. The fan housing is preferably mounted on the lower flange and the lower flange is mounted about the column. The electric fan has a high speed motor and is mounted within the fan housing and is in electrical communication with an electric power source via the electrical connection located in the junction box.

The fan housing preferably comprises an exteriorly mounted junction box with the electrical connection made to utility power to operate the fan continuously to remove the liberated chlorine gas. The continuous removal of chlorine gas effectively prevents a buildup of gases that may allow a back pressure event to expel chlorine gas into an enclosed human occupied environment. The electric fan is used to pull ambient air through the fan housing and push the air around and past the cone assembly, through the lower body and through the upper body to exhaust piping. In this way the liberated chlorine gas may be safely and efficiently removed out of harm's way. Further, the chlorine gas odors are efficiently removed providing a fresh-smelling environment in which individuals may work.

The present invention holds significant improvements and serves as a chlorine tablet chlorinator vacuum evacuation system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, chlorine tablet chlorinator vacuum evacuation systems, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a water treatment chlorination device and more particularly to a chlorine tablet chlorinator vacuum evacuation system as used to improve the safety of use of tablet chlorinators.

Generally speaking, the chlorine tablet chlorinator vacuum evacuation system is an apparatus for connecting to the vent tube on a tablet chamber of a chlorine tablet chlorinator for continuously removing any buildup of chlorine gas within the chamber so that in a back-pressure event, chlorine gas will not be expelled into the breathing air space of a room such that occupants may be endangered or electrical/electronic equipment is damaged. The apparatus utilizes a high speed fan in conjunction with a nozzle and a cone to create a venturi effect providing a negative pressure on the vacuum port which safely draws liberated chlorine gas out of the tablet chamber.

Figure 1:
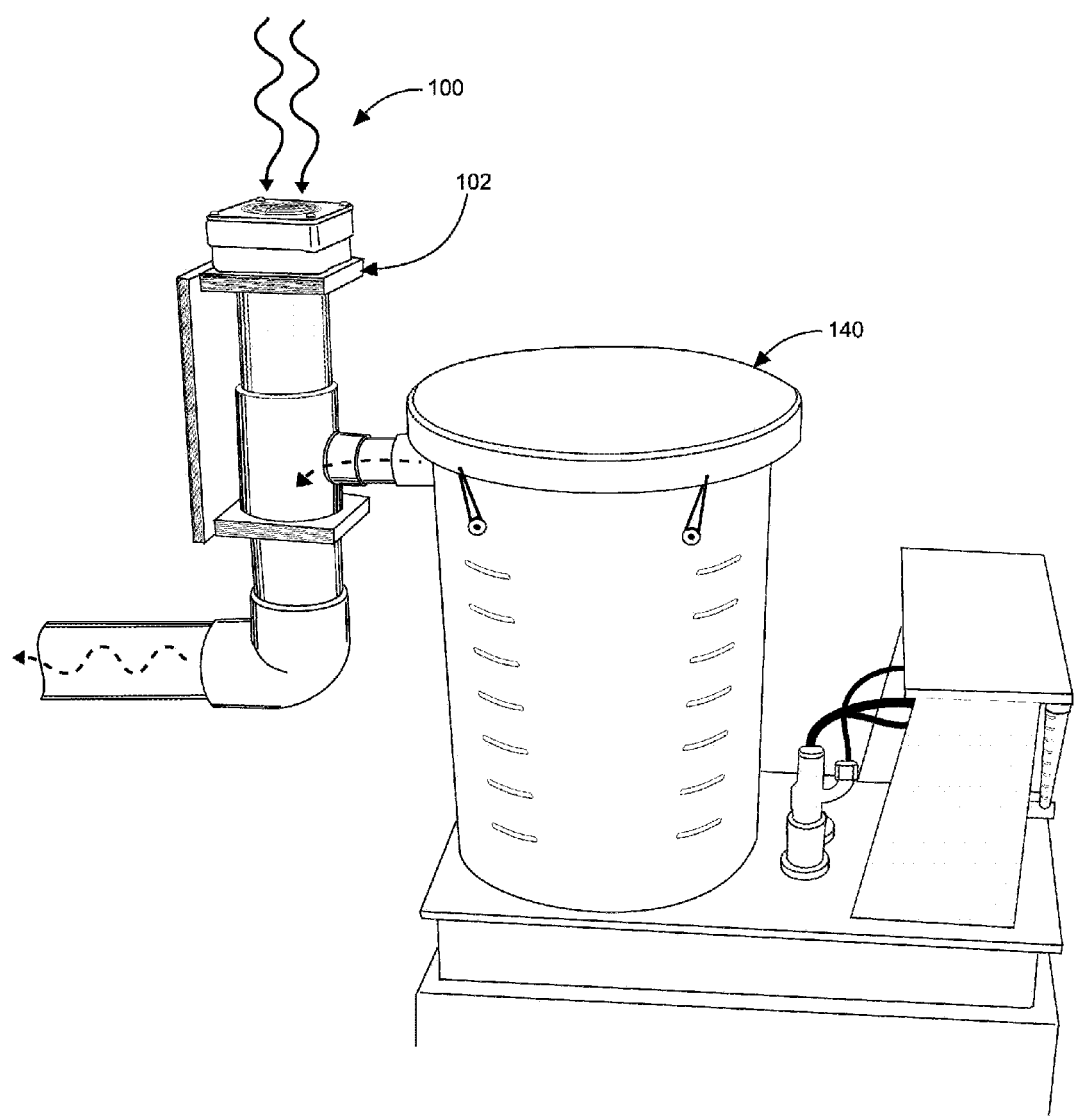
FIG. 1 shows an in-use condition illustrating a chlorine tablet chlorinator vacuum evacuation system in an in-use (installed) condition according to an embodiment of the present invention.

Now in greater detail, referring to the drawings by numerals of reference, there is shown in FIG. 1 a perspective view illustrating an in-use condition of chlorine tablet chlorinator vacuum evacuation system 100 according to an embodiment of the present invention.

Chlorine tablet chlorinator vacuum evacuation system 100 comprises tablet chamber vacuum assembly 102 having upper body 110 and lower body 150. Upper body 110 may comprise cylinder 112 with vacuum port 114, intake opening 116, discharge opening 118, upper flange 120, and elbow 122. Lower body 150 may comprise column 152 having inlet aperture 154, discharge aperture 156, stepped venturi nozzle 158, cone assembly 160 having conical tip 162 that is integral with tubular body 164 and spacer fins 166. The tubular body 164 is preferably slotted to receive spacer fins 166. Lower body 150 may further comprise lower flange 170, fan housing 180 for mounting an electric fan 184 therein, junction box 190 with an electrical connection, and mounting plate 199.

Referring again to upper body 110, vacuum port 114 and cylinder 112 are preferably integral, vacuum port 114 positioned perpendicularly to discharge opening 118 and to intake opening 116 of cylinder 112. Intake opening 116 of upper body 110 is mounted circumferentially over and about discharge aperture 156 of lower body 150; lower body 150 mounted to fan housing 180, upper body 110 and lower body 150 positioned in static coupled relationship via mounting plate 199. Upper flange 120 and lower flange 170 are secured to mounting plate 199 and upper flange 120 is mounted to discharge opening 118 of cylinder 112.

Elbow 122 is mounted to discharge opening 118 of cylinder 112 whereby elbow 122 is able to be connected to exhaust piping enabling off-gassed chlorine to be remotely exhausted. Elbow 122 is preferably used to increase resistance to increase vacuum. Cone assembly 160 is received interiorly within an inner volume of lower body 150 wherein spacer fins 166 provide that cone assembly 160 is mounted concentrically within inlet aperture 154 of lower body 150. Conical tip 162 faces towards discharge aperture 156 of lower body 150 and extends into tapered interior volume of stepped venturi nozzle 158, tubular body 164 and spacer fins 166 contained within inner volume of lower body 150. Elbow 122 of upper body 110 is preferably about 3 inches in diameter and comprises an angle of about 90 degrees. As air travels through lower body 150, it is reduced in volume and increased in velocity in relation to tapered interior volume of stepped venturi nozzle 158 and conical tip 162 such that vacuum is created at vacuum port 114. Vacuum evacuates off-gassed chlorine out of tablet chamber 140 of a tablet chlorinator such that off-gassed chlorine is able to be safely dispersed in a controlled manner. Tablet chamber vacuum assembly 102 is able to be mounted to a tablet chamber 140 by vacuum port 114 at any angle throughout 360 degree rotation, as previously mentioned. In this way the present invention is suitable for installation within virtually any space.

Figure 2:
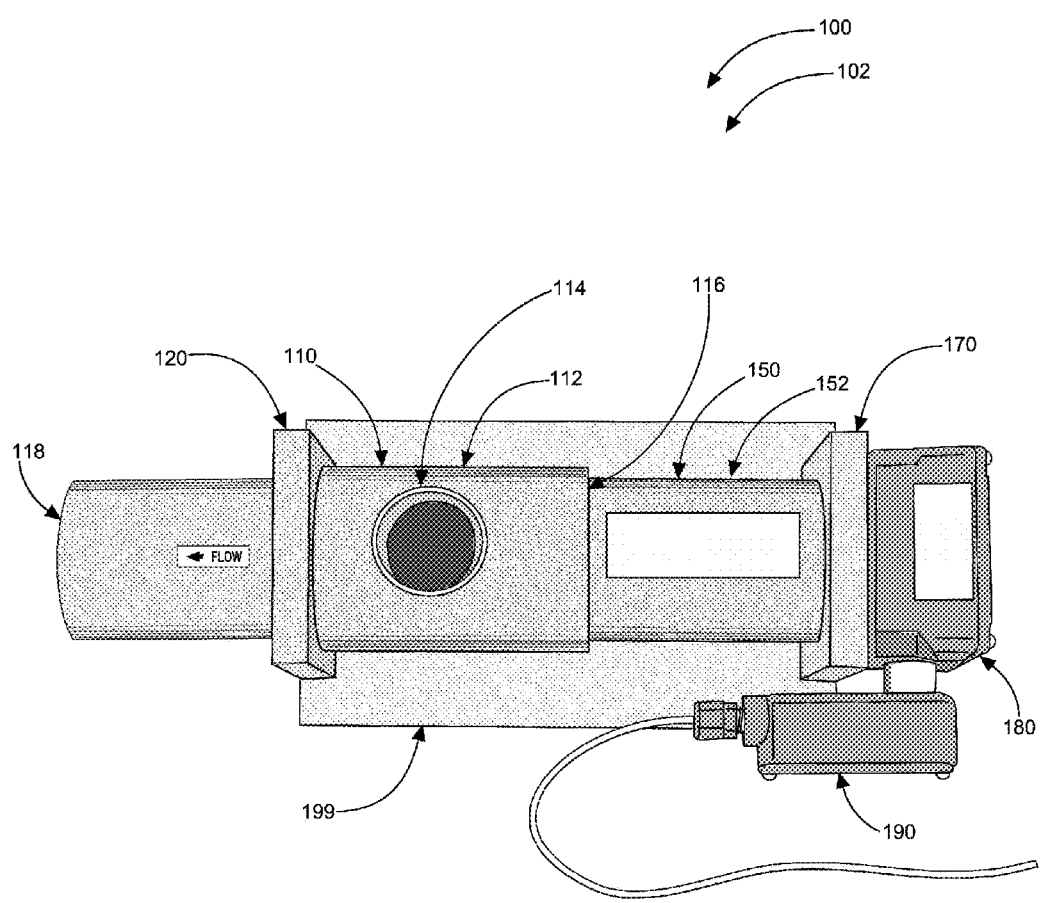
FIG. 2 is a top view illustrating the chlorine tablet chlorinator vacuum evacuation system according to an embodiment of the present invention of FIG. 1.

Referring now to FIG. 2 a top view illustrating chlorine tablet chlorinator vacuum evacuation system 100 according to an embodiment of the present invention of FIG. 1. Mounting plate 199 secures upper body 110 and lower body 150 together (coupled together) and provides that tablet chamber vacuum assembly 102 is able to be mounted to a wall via fasteners and vacuum port 114 is able to be plumbed remotely to a tablet chamber. Column 152 of lower body 150 is preferably about 3 inches in diameter and cylinder 112 of upper body 110 is preferably about 3 inches in diameter to achieve optimized flow. Tablet chamber vacuum assembly 102 is chlorine resistant such that it remains reliable throughout its service life, thereby creating a cost-effective solution.

Figure 3:
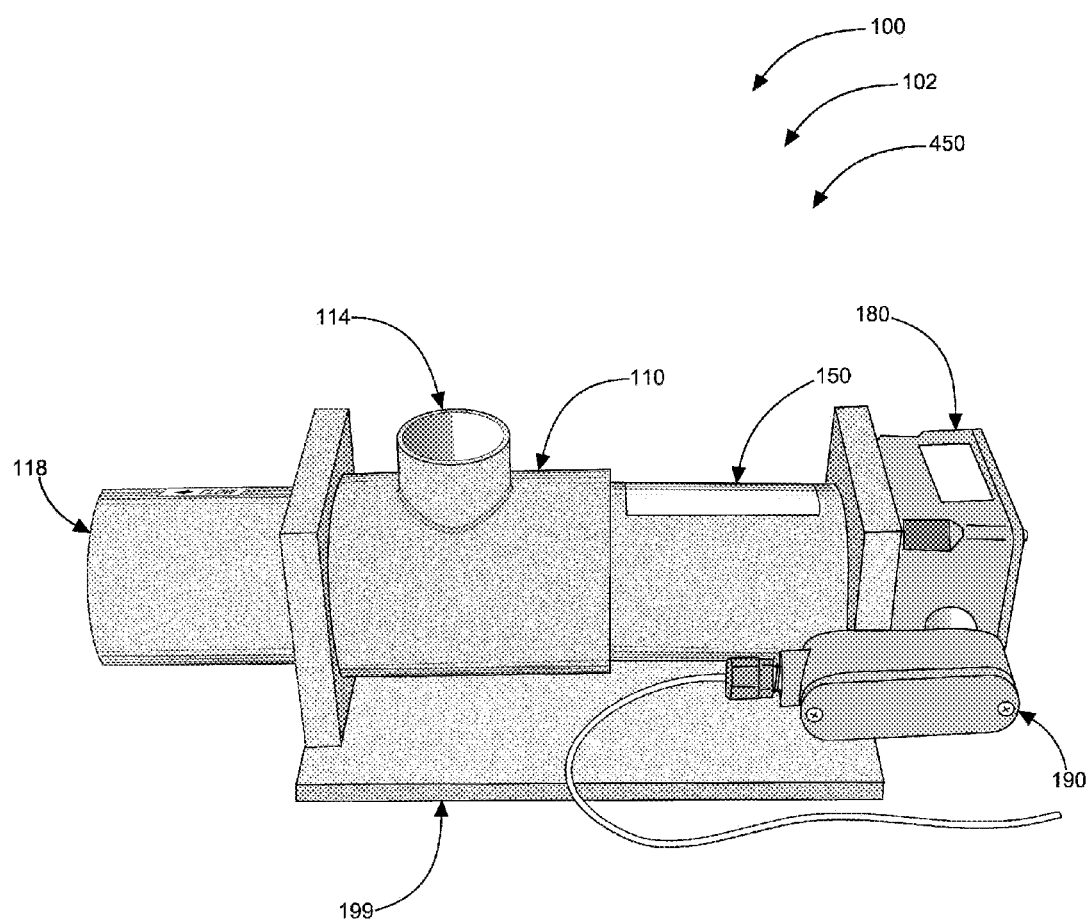
FIG. 3 is a side perspective view illustrating the chlorine tablet chlorinator vacuum evacuation system according to an embodiment of the present invention of FIG. 1.

Referring now to FIG. 3, showing a side view illustrating chlorine tablet chlorinator vacuum evacuation system 100 also according to an embodiment of the present invention of FIG. 1. Electric fan 184 is preferably a high speed electric fan 184 designed for continuous operation such that chlorine gas and chlorine odor is continuously removed from tablet chamber 140. Cylinder 112 having vacuum port 114 may comprise a pipe tee with vacuum port 114 of cylinder 112 preferably measuring about 1½ inches in diameter. Elbow 122 of upper body 110 may measure about 3 inches in diameter and may comprises an angle of about 90 degrees however other joints and orientations may be used. In preferred embodiments all parts of tablet chamber vacuum assembly 102 comprise acrylonitrile butadiene styrene plastic and are thus inherently resistant to chlorine damage. Fan housing 180 comprises an exteriorly mounted junction box 190 wherein an electrical connection is able to be made to utility power to operate electric fan 184 continuously.

Figure 4:
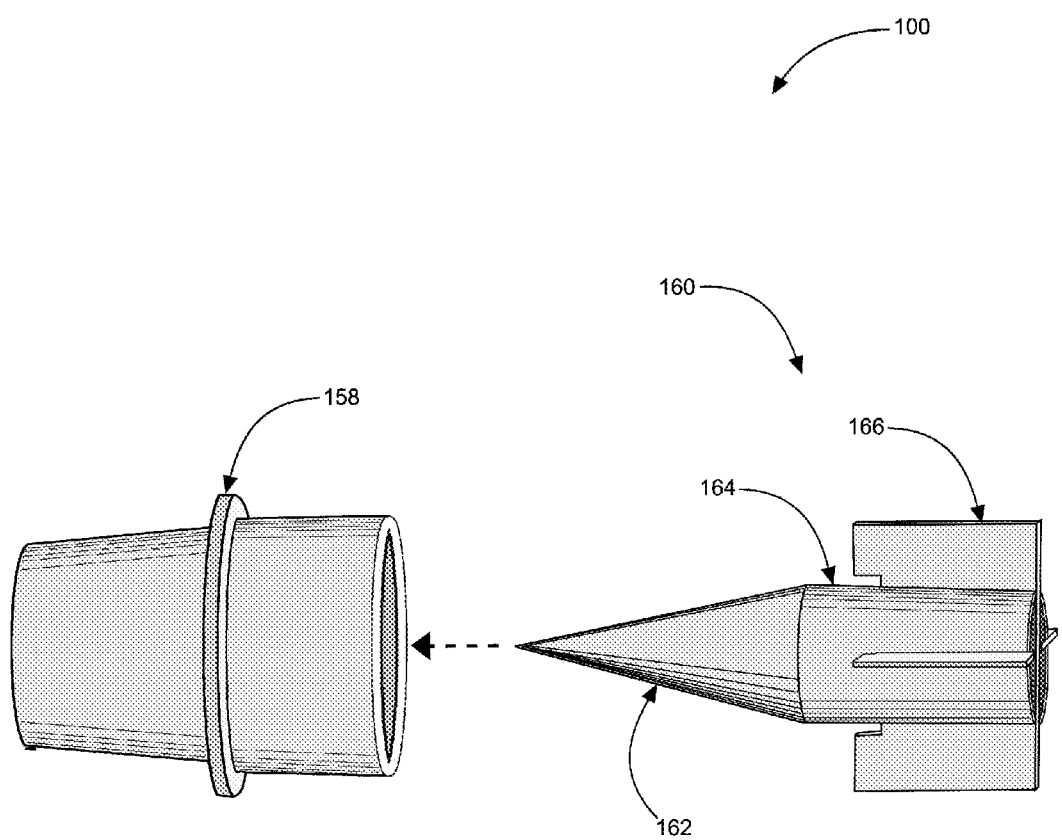
FIG. 4 is a perspective view illustrating a nozzle and cone assembly of the chlorine tablet chlorinator vacuum evacuation system according to an embodiment of the present invention of FIG. 1.

Referring now to FIG. 4 a perspective view illustrating stepped venturi nozzle 158 and cone assembly 160 of tablet chamber vacuum assembly 102 according to an embodiment of the present invention of FIG. 1. Tablet chamber vacuum assembly 102 continuously removes liberated chlorine gas and its odor such that a back pressure event does not expel concentrated chlorine gas and its odor into an enclosed human occupied environment. Tablet chamber vacuum assembly 102 is able to be attached to more than one chlorine containing tank connected in series in some embodiments. Vacuum port 114 is removably attached to a down tube extending through a sidewall of tablet chamber 140.

Figure 5:
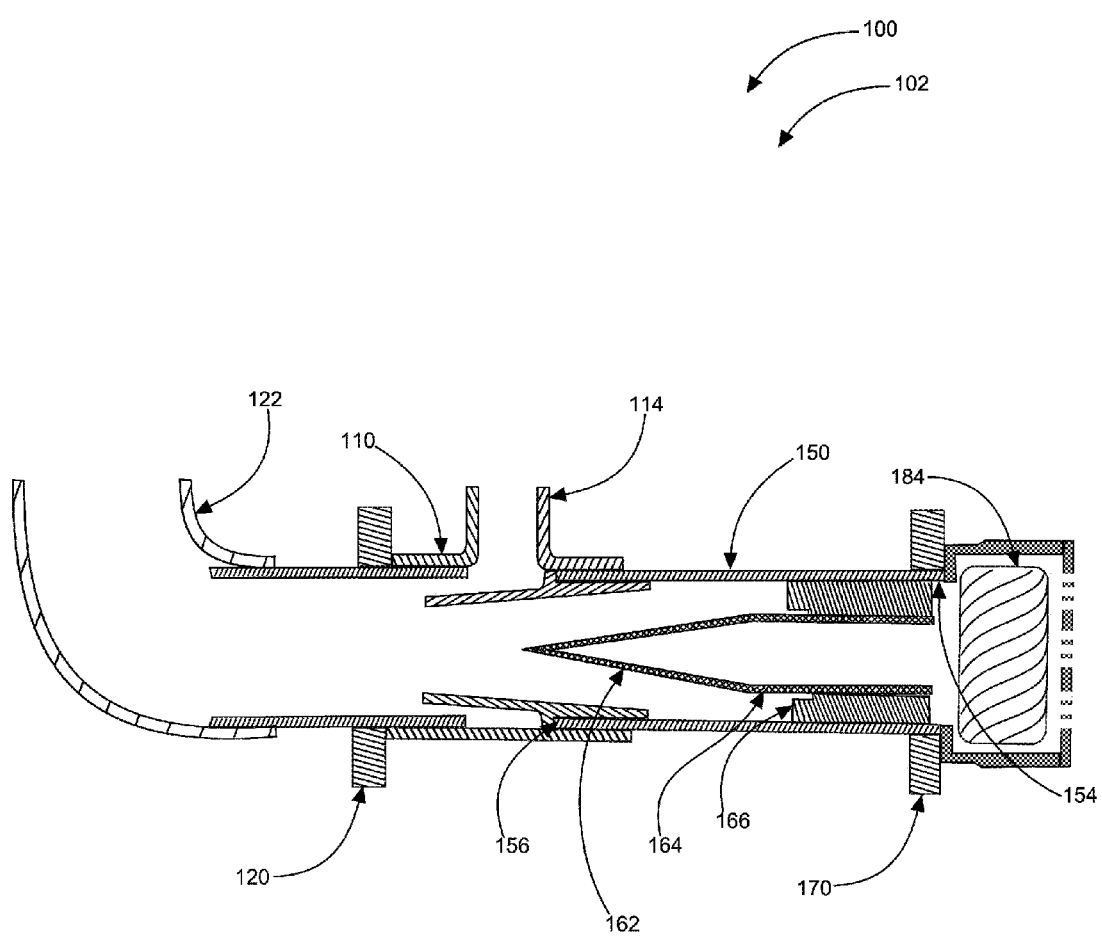
FIG. 5 is a cutaway view illustrating the chlorine tablet chlorinator vacuum evacuation system according to an embodiment of the present invention of FIGS. 1-4.

FIG. 5 is a cutaway view illustrating chlorine tablet chlorinator vacuum evacuation system 100 according to an embodiment of the present invention of FIG. 1. Cutaway view depicts relative air flow movement through fan housing 180 and into lower body 150 around cone assembly 160 within stepped venturi nozzle 158. Air flow velocity increases creating a venturi effect as it passes vacuum port 114 thereby siphoning off-gassed chlorine into upper body 110 of tablet chamber vacuum assembly 102 where it is piped outside of a building and safely dispersed into open air. In this way sufficient vacuum may be efficiently achieved.

Chlorine tablet chlorinator vacuum evacuation system 100 may be sold as kit 450 comprising the following parts: at least one tablet chamber vacuum assembly 102 having upper body 110, lower body 150, at least one cone assembly 160; at least one electric fan 184; and at least one set of user instructions. Chlorine tablet chlorinator vacuum evacuation system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different connection combinations and orientations, parts may be sold separately, etc., may be sufficient.

Figure 6:
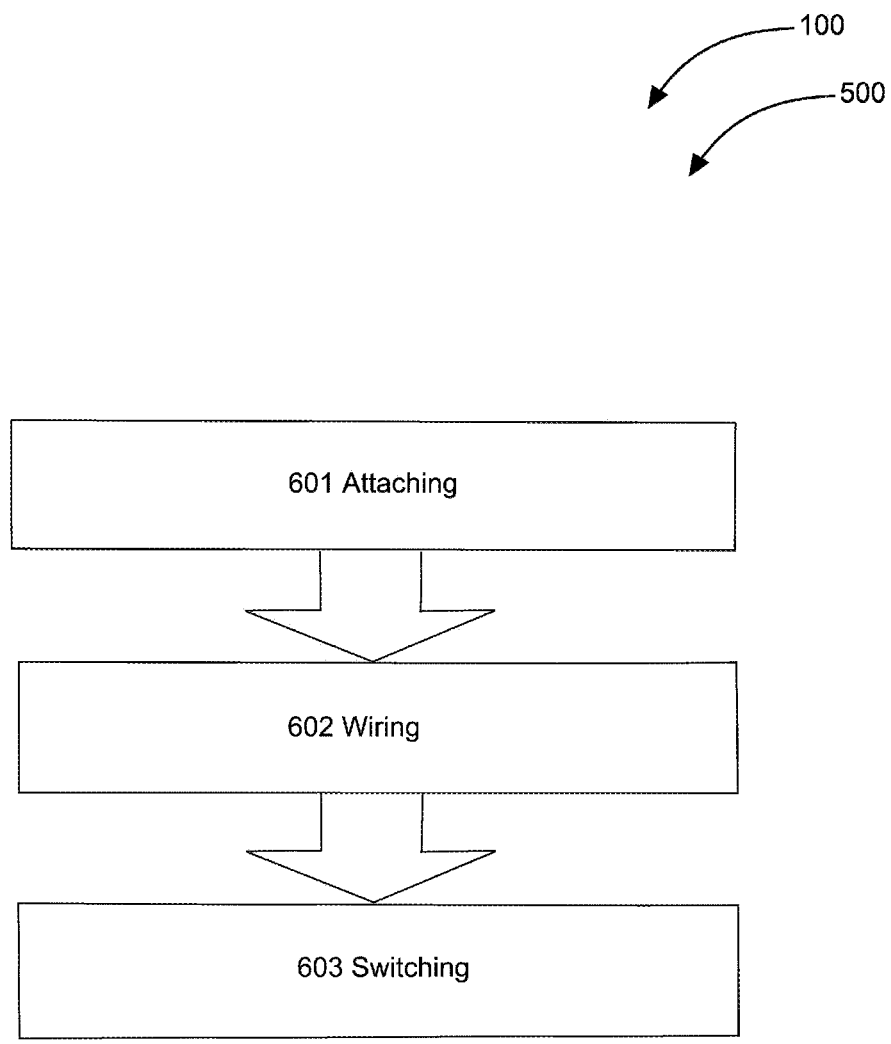
FIG. 6 is a flowchart illustrating a method of use of the chlorine tablet chlorinator vacuum evacuation system according to an embodiment of the present invention of FIGS. 1-5.

Referring now to FIG. 6 showing a flowchart illustrating method of use 600 for chlorine tablet chlorinator vacuum evacuation system 100 according to an embodiment of the present invention of FIGS. 1-5. Method of use 600 may comprise the steps of: step one 601, attaching vacuum port 114 of an assembled tablet chamber vacuum assembly 102 to tablet chamber 140; step two 602, wiring an electric fan 184 motor of tablet chamber vacuum assembly 102 to utility power; and step three 603, switching utility power to an on position to remove odors and gasses present on a continuous basis.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A chlorine tablet chlorinator vacuum evacuation system comprising:
   a tablet chamber vacuum assembly having:
      an upper body having:
         a cylinder having a vacuum port;
         an intake opening;
         a discharge opening;
         an upper flange; and
         an elbow;
      a lower body having:
         a column having:
            an inlet aperture;
            a discharge aperture;
            a stepped venturi nozzle;
            a cone assembly having:
               a conical tip integral with a tubular body having spacer fins said tubular body slotted to receive said spacer fins;
         a lower flange;
         a fan housing for mounting an electric fan therein;
      a junction box with an electrical connection; and
      a mounting plate;
   wherein said vacuum port and said cylinder are integral, said vacuum port positioned perpendicularly to said discharge opening and to said intake opening of said cylinder;
   wherein said intake opening of said upper body is mounted circumferentially over and about said discharge aperture of said lower body, said lower body mounted to said fan housing, said upper body and said lower body positioned in a static coupled relationship via said mounting plate, said upper flange and said lower flange secured to said mounting plate;
   wherein said upper flange is mounted to said discharge opening of said cylinder;
   wherein said elbow is mounted to said discharge opening of said cylinder, whereby said elbow is able to be connected to exhaust piping enabling off-gassed chlorine to be remotely exhausted;
   wherein said cone assembly is received interiorly within an inner volume of said lower body, wherein said spacer fins provide that said cone assembly is mounted concentrically within said inlet aperture of said lower body, said conical tip facing towards said discharge aperture of said lower body;
   wherein said conical tip of said cone assembly extends into a tapered interior volume of said stepped venturi nozzle, said tubular body and said spacer fins contained within said inner volume of said lower body;
   wherein said fan housing is mounted on said lower flange, said lower flange mounted about said column;
   wherein said electric fan is mounted within said fan housing, said electric fan in electrical communication with an electric power source via said electrical connection located in said junction box;
   wherein said electric fan is used to pull ambient air through said fan housing, push said air around said cone assembly, through said lower body and through said upper body to said exhaust piping;
   wherein said air as it travels through said lower body is reduced in volume and increased in velocity in relation to said tapered interior volume of said stepped venturi nozzle and said conical tip such that a vacuum is created at said vacuum port; and
   wherein said vacuum evacuates said off-gassed chlorine out of a tablet chamber of a tablet chlorinator such that said off-gassed chlorine is able to be safely dispersed in a controlled manner.

2. The chlorine tablet chlorinator vacuum evacuation system of claim 1 wherein said tablet chamber vacuum assembly is able to be mounted to said tablet chamber by said vacuum port at any angle throughout a 360 degree rotation.

3. The chlorine tablet chlorinator vacuum evacuation system of claim 1 wherein said mounting plate secures said upper body and said lower body together and provides that said tablet chamber vacuum assembly is able to be mounted to a wall via fasteners and said vacuum port is able to be plumbed remotely to said tablet chamber.

4. The chlorine tablet chlorinator vacuum evacuation system of claim 1 wherein flow is continuous to continually remove chlorine smell.

5. The chlorine tablet chlorinator vacuum evacuation system of claim 1 wherein said column of said lower body is about 3 inches in diameter.

6. The chlorine tablet chlorinator vacuum evacuation system of claim 1 wherein said cylinder of said upper body is about 3 inches in diameter.

7. The chlorine tablet chlorinator vacuum evacuation system of claim 6 wherein said cylinder having said vacuum port comprises a pipe Tee.

8. The chlorine tablet chlorinator vacuum evacuation system of claim 6 wherein said vacuum port of said cylinder is about 1½ inches in diameter.

9. The chlorine tablet chlorinator vacuum evacuation system of claim 1 wherein said fan is a high speed said fan.

10. The chlorine tablet chlorinator vacuum evacuation system of claim 1 wherein said tablet chamber vacuum assembly is Chlorine resistant.

11. The chlorine tablet chlorinator vacuum evacuation system of claim 1 wherein said tablet chamber vacuum assembly comprises acrylonitrile butadiene styrene plastic.

12. The chlorine tablet chlorinator vacuum evacuation system of claim 1 wherein elbow of said upper body is about 3 inches in diameter.

13. The chlorine tablet chlorinator vacuum evacuation system of claim 1 wherein said elbow of said upper body comprises an angle of about 90 degrees.

14. The chlorine tablet chlorinator vacuum evacuation system of claim 1 wherein said fan housing comprises an exteriorly mounted junction box wherein an electrical connection is able to be made to utility power to operate said fan continuously.

15. The chlorine tablet chlorinator vacuum evacuation system of claim 1 wherein said tablet chamber vacuum assembly continuously removes liberated said Chlorine gas such that a back pressure event does not expel said Chlorine gas into an enclosed human occupyable environment.

16. The chlorine tablet chlorinator vacuum evacuation system of claim 1 wherein said tablet chamber vacuum assembly is able to be attached to more than one said Chlorine containing tank connected in series.

17. The chlorine tablet chlorinator vacuum evacuation system of claim 1 wherein said vacuum port is removably attached to a down tube extending through a sidewall of said tablet chamber.

18. A chlorine tablet chlorinator vacuum evacuation system comprising:
　a tablet chamber vacuum assembly having:
　　an upper body having:
　　　a cylinder having a vacuum port;
　　　an intake opening;
　　　a discharge opening;
　　　an upper flange; and
　　　an elbow;
　　a lower body having:
　　　a column having:
　　　　an inlet aperture;
　　　　a discharge aperture;
　　　　a stepped venturi nozzle;
　　　　a cone assembly having:
　　　　　a conical tip integral with a tubular body having spacer fins said tubular body slotted to receive said spacer fins;
　　　　a lower flange;
　　a fan housing for mounting an electric fan therein;
　　a junction box with an electrical connection; and
　　a mounting plate;
　wherein said vacuum port and said cylinder are integral, said vacuum port positioned perpendicularly to said discharge opening and to said intake opening of said cylinder;
　wherein said tablet chamber vacuum assembly is able to be mounted to said tablet chamber by said vacuum port at any angle throughout a 360 degree rotation;
　wherein said tablet chamber vacuum assembly is able to be attached to more than one said Chlorine containing tank connected in series;
　wherein said vacuum port is removably attached to a down tube extending through a sidewall of said tablet chamber;
　wherein said intake opening of said upper body is mounted circumferentially over and about said discharge aperture of said lower body, said lower body mounted to said fan housing, said upper body and said lower body positioned in a static coupled relationship via said mounting plate, said upper flange and said lower flange secured to said mounting plate;
　wherein said column of said lower body is about 3 inches in diameter;
　wherein said cylinder of said upper body is about 3 inches in diameter;
　wherein said cylinder having said vacuum port comprises a pipe Tee;
　wherein said vacuum port of said cylinder is about 1½ inches in diameter;
　wherein said upper flange is mounted to said discharge opening of said cylinder;
　wherein said elbow is mounted to said discharge opening of said cylinder,
　whereby said elbow is able to be connected to exhaust piping enabling off-gassed chlorine to be remotely exhausted;
　wherein said tablet chamber vacuum assembly is Chlorine resistant;
　wherein said tablet chamber vacuum assembly comprises acrylonitrile butadiene styrene plastic;
　wherein said cone assembly is received interiorly within an inner volume of said lower body, wherein said spacer fins provide that said cone assembly is mounted concentrically within said inlet aperture of said lower body, said conical tip facing towards said discharge aperture of said lower body;
　wherein said conical tip of said cone assembly extends into a tapered interior volume of said stepped venturi nozzle, said tubular body and said spacer fins contained within said inner volume of said lower body;
　wherein said fan housing is mounted on said lower flange, said lower flange mounted about said column;
　wherein said electric fan is mounted within said fan housing, said electric fan in electrical communication with an electric power source via said electrical connection located in said junction box;
　wherein said fan is a high speed said fan;
　wherein said fan housing comprises an exteriorly mounted junction box wherein an electrical connection is able to be made to utility power to operate said fan continuously;
　wherein air flow is continuously removing liberated chlorine gas;
　wherein said tablet chamber vacuum assembly continuously removes liberated said Chlorine gas such that a back pressure event does not expel said Chlorine gas into an enclosed human occupyable environment;
　wherein said electric fan is used to pull ambient air through said fan housing, push said air around said cone assembly, through said lower body and through said upper body to said exhaust piping;
　wherein elbow of said upper body is about 3 inches in diameter;
　wherein said elbow of said upper body comprises an angle of about 90 degrees;

wherein said air as it travels through said lower body is reduced in volume and increased in velocity in relation to said tapered interior volume of said stepped venturi nozzle and said conical tip such that a vacuum is created at said vacuum port; and wherein said vacuum evacuates said off-gassed chlorine out of a tablet chamber of a tablet chlorinator such that said off-gassed chlorine is able to be safely dispersed in a controlled manner.

19. The chlorine tablet chlorinator vacuum evacuation system of claim 18 further comprising a kit having:
   at least one said tablet chamber vacuum assembly having;
      said upper body;
      said lower body;
      said cone assembly;
      said fan; and
      a set of user instructions.

* * * * *